United States Patent
Fang et al.

(10) Patent No.: US 11,733,477 B2
(45) Date of Patent: Aug. 22, 2023

(54) OPTICAL ACTUATOR, AND CORRESPONDING CAMERA MODULE AND CAMERA MODULE ARRAY

(71) Applicant: NINGBO SUNNY OPOTECH CO., LTD., Yuyao (CN)

(72) Inventors: Yinli Fang, Yuyao (CN); Hongde Tu, Yuyao (CN); Zhenyu Chen, Yuyao (CN); Jianlong Zhang, Yuyao (CN)

(73) Assignee: NINGBO SUNNY OPOTECH CO., LTD., Yuyao (CN)

( * ) Notice: Subject to any disclaimer, the term of this patent is extended or adjusted under 35 U.S.C. 154(b) by 642 days.

(21) Appl. No.: 16/771,572

(22) PCT Filed: Oct. 10, 2018

(86) PCT No.: PCT/CN2018/109681
§ 371 (c)(1),
(2) Date: Jun. 10, 2020

(87) PCT Pub. No.: WO2019/137048
PCT Pub. Date: Jul. 18, 2019

(65) Prior Publication Data
US 2020/0310224 A1    Oct. 1, 2020

(30) Foreign Application Priority Data

Jan. 12, 2018 (CN) .......................... 201810031601.7
Jan. 12, 2018 (CN) .......................... 201820053573.4

(51) Int. Cl.
G02B 7/09    (2021.01)
F03G 7/06    (2006.01)
(Continued)

(52) U.S. Cl.
CPC ............... *G02B 7/09* (2013.01); *F03G 7/065* (2013.01); *G03B 13/36* (2013.01); *H02N 10/00* (2013.01)

(58) Field of Classification Search
None
See application file for complete search history.

(56) References Cited

U.S. PATENT DOCUMENTS 8,350,959 B2   1/2013  Topliss et al.
8,503,119 B2   8/2013  Sato et al.
(Continued)

FOREIGN PATENT DOCUMENTS

CN   101416090 A   4/2009
CN   102770804 A   11/2012
(Continued)

OTHER PUBLICATIONS

International Search Report issued in PCT/CN2018/109681 (PCT/ISA/210), dated Dec. 28, 2018.
(Continued)

*Primary Examiner* — Darryl J Collins
*Assistant Examiner* — Tamara Y. Washington
(74) *Attorney, Agent, or Firm* — Birch, Stewart, Kolasch & Birch, LLP

(57) ABSTRACT

An optical actuator, including: a base; a lens module comprising two first side surfaces opposite each other; and a plurality of shape memory alloy wires forming two wire groups, the two wire groups being disposed on the two first side surfaces, respectively, wherein two ends of each shape memory alloy wire are fixed to a base-end fixing device and a lens-end fixing device, respectively; and the direction of the resultant force acting on the lens module by the two wire groups is consistent with the direction of the optical axis of the lens module, so that the lens module is driven to move (Continued)

along the direction of the optical axis of the lens module by means of expansion and contraction of the shape memory alloy wires of the two wire groups.

19 Claims, 6 Drawing Sheets

(51) Int. Cl.
 *G03B 13/36* (2021.01)
 *H02N 10/00* (2006.01)

(56) References Cited

U.S. PATENT DOCUMENTS

| | | | |
|---|---|---|---|
| 8,830,335 B2 * | 9/2014 | Topliss | G02B 7/08 |
| | | | 359/554 |
| 2012/0019675 A1 | 1/2012 | Brown | |
| 2013/0002933 A1 | 1/2013 | Topliss et al. | |
| 2013/0222685 A1 | 8/2013 | Topliss et al. | |
| 2015/0288865 A1 | 10/2015 | Osborne | |
| 2015/0322929 A1 | 11/2015 | Morikawa et al. | |

FOREIGN PATENT DOCUMENTS

| | | |
|---|---|---|
| CN | 103168264 A | 6/2013 |
| CN | 107517285 A | 12/2017 |
| CN | 207937737 U | 10/2018 |
| WO | WO 2011/104518 A1 | 9/2011 |
| WO | WO 2016/189314 A1 | 12/2016 |

OTHER PUBLICATIONS

Extended European Search Report for European Application No. 18899895.9, dated Feb. 10, 2021.

* cited by examiner

OPTICAL ACTUATOR, AND CORRESPONDING CAMERA MODULE AND CAMERA MODULE ARRAY

CROSS-REFERENCE TO RELATED APPLICATIONS

The present application claims the priority and benefit of Chinese Patent Applications Nos. 201810031601.7 and 201820053573.4, filed with the State Intellectual Property Office of China on Jan. 12, 2018, the entire contents of which are incorporated herein by reference.

TECHNICAL FIELD

The present disclosure relates to the technical field of optics. Specifically, the present disclosure relates to an optical actuator and a corresponding camera module and camera module array.

BACKGROUND

Nowadays, with the continuous development and growth of the mobile phone industry, smart phones can integrate more and more functions. In the case where it is difficult to continue to improve the integrated functions of mobile phones, most mobile phone manufacturers focus their attention on the camera function of mobile phones, and hope to enhance the user experience through the camera function and gain a bigger selling point. With the continuous improvement of mobile phone pixels, the users can obtain clearer and higher-quality images. However, in practice, there is also a problem with taking pictures on a mobile phone that it is difficult to take a clear image of a distant image, or if an image of a distant image taken at a lower magnification is enlarged, the picture is likely to become blurred. Therefore, it is expected that the camera module will have a large-stroke zoom capability. However, smart phones are getting thinner and lighter, and the space for accommodating camera modules in the mobile phone is very limited, which is contradictory to people's expectations for greater zoom capabilities.

Since the shape memory alloy (SMA) wire has the property of expanding and contracting with temperature changes, the lens can be driven to move by using the shape memory alloy wire instead of the traditional motor. Moreover, because the shape memory alloy wire occupies a smaller volume, it can effectively reduce the volume of the camera module.

On the other hand, in order to enable mobile phones to take clearer and higher-quality pictures, people in the industry hope to take pictures by applying periscope camera modules on the mobile phones. Although the camera using the periscope camera module has a smaller volume compared to the traditional external zoom camera, for mobile phones, the volume of the existing periscope camera module is still not small enough, and the main reason is that the mobile phone gets thinner and thinner, and the internal design of the mobile phone is more compact. Therefore, the existing periscope camera module is difficult to reduce in volume and it is difficult to have a strong market application prospect.

In summary, there is an urgent need for solutions that can overcome the above shortcomings.

SUMMARY

The present disclosure is intended to provide a solution that can overcome at least one of the above shortcomings of the prior art.

According to an aspect of the present disclosure, there is provided an optical actuator, comprising:

a base;

a lens module having an outer side surface including two first side surfaces opposite to each other; and a plurality of shape memory alloy wires forming two wire groups, wherein the two wire groups are disposed on the two first side surfaces, respectively; and two ends of each shape memory alloy wire are fixed on a base-end fixing device and a lens-end fixing device, respectively, the base-end fixing device is fixed to the base, and the lens-end fixing device is disposed on the first side surface and fixed to the lens module;

wherein the direction of the resultant force acting on the lens module by the two wire groups is consistent with the direction of the optical axis of the lens module, so that the lens module is driven to move along the direction of the optical axis of the lens module by means of expansion and contraction of the shape memory alloy wires of the two wire groups.

In some embodiments, each of the two wire groups includes two sub-wire groups, each sub-wire group including two shape memory alloy wires;

wherein for each sub-wire group, projections of its two shape memory alloy wires on the first side surface are in a crossing state, and the two shape memory alloy wires are staggered in the direction perpendicular to the first side surface, so that the two shape memory alloy wires are not coplanar.

In some embodiments, two sub-wire groups arranged on the same first side surface are configured in a symmetrical state so that the lens module keeps balanced.

In some embodiments, for the two sub-wire groups arranged on the same first side surface, each of the sub-wire groups generates a moment that causes the lens module to deflect due to its two shape memory alloy wires being staggered in the direction perpendicular to the first side surface, and the two sub-wire groups are configured so that the moments that cause the lens module to deflect respectively generated by them cancel each other or partially cancel each other.

In some embodiments, the base is a support base, and the upper surface of the support base has a limit structure to prevent the lens module from deviating from the optical axis.

In some embodiments, the outer side surface further includes two second side surfaces, wherein each of the second side surfaces intersects the first side surfaces and the two second side surfaces are disposed opposite to each other, and the limit structure includes two second limit structures respectively disposed outside the two second side surfaces.

In some embodiments, the limit structure further includes two first limit structures respectively disposed outside the two first side surfaces.

In some embodiments, the bottom surface of the lens module has a limit hole, the limit structure is a limit column adapted to the limit hole, and the limit column is disposed on the upper surface of the support base at the position corresponding to the limit hole on the bottom surface of the lens module.

In some embodiments, the bottom surface of the lens module has a limit column, the limit structure is a limit hole adapted to the limit column, and the limit hole is disposed at the position of the support base corresponding to the limit column on the bottom surface of the lens module.

In some embodiments, the lens-end fixing device includes a protrusion provided in the central area of the first side surface and protruding outward; and the base-end fixing device includes a fixing plate disposed outside the first side surface, and the surface of the fixing plate is disposed opposite to the first side surface, and has a through hole adapted to the protrusion.

In some embodiments, the surface of the fixing plate facing away from the first side surface has a base-end fixing terminal, a lens-end fixing terminal is provided on the protrusion, each of the shape memory alloy wires has two mounting ends, and the two mounting ends are mounted on the base-end fixing terminal and the lens-end fixing terminal, respectively.

In some embodiments, each of the fixing plates has four base-end fixing terminals, and the four base-end fixing terminals are each disposed at positions on the surface of the fixing plate facing away from the first side surface away from the protrusion.

In some embodiments, each of the protrusions has four lens-end fixing terminals.

In some embodiments, each of the first side surfaces has two edges perpendicular to the surface of the base; the lens-end fixing device is a lens-end fixing terminal disposed on the first side surface; and the base-end fixing device is two vertical columns fixed to the base, the two vertical columns are arranged along the two edges, respectively, and there is a gap between the vertical column and the first side surface.

In some embodiments, each of the vertical columns has two base-end fixing terminals, and the first side surface is provided with four lens-end fixing terminals; wherein each of the shape memory alloy wires has two mounting ends, and the two mounting ends are mounted on the base-end fixing terminal and the lens-end fixing terminal, respectively.

In some embodiments, each of the base-end fixing devices has four base-end fixing terminals, and each of the lens-end fixing devices has four lens-end fixing terminals; wherein each of the shape memory alloy wires has two mounting ends, and the two mounting ends are mounted on the base-end fixing terminal and the lens-end fixing terminal, respectively.

In some embodiments, each of the first side surfaces has four corners; the four lens-end fixing terminals are arranged at positions on the lens-end fixing device corresponding to the four corners of the first side surface, respectively; and the four base-end fixing terminals are arranged at positions on the base-end fixing device corresponding to the four corners of the first side surface, respectively.

In some embodiments, each of the first side surfaces has four corners and has two edges parallel to the optical axis of the lens module;

the four lens-end fixing terminals are arranged at positions on the lens-end fixing device corresponding to the four corners of the first side surface, respectively; and two of the four base-end fixing terminals are arranged along one of the two edges, the other two of the four base-end fixing terminals are arranged along the other one of the two edges, and the distance between the two base-end fixing terminals arranged along the same edge is smaller than the distance between the corresponding two lens-end fixing terminals.

In some embodiments, each of the first side surfaces has two edges parallel to the optical axis of the lens module; the four lens-end fixing terminals are arranged in the central area of the first side surface; and two of the four base-end fixing terminals are arranged along one of the two edges, and the other two of the four base-end fixing terminals are arranged along the other one of the two edges.

In some embodiments, the projections of any two shape memory alloy wires belonging to different sub-wire groups on the first side surface do not cross.

In some embodiments, each of the first side surfaces has two edges perpendicular to the optical axis of the lens module; the four lens-end fixing terminals are arranged in the central area of the first side surface; and two of the four base-end fixing terminals are arranged along one of the two edges, and the other two of the four base-end fixing terminals are arranged along the other one of the two edges.

In some embodiments, there are two shape memory alloy wires belonging to different sub-wire groups, and the projections of the two shape memory alloy wires on the first side surface are in a crossing state.

In some embodiments, the heights of the base-end fixing device and the lens-end fixing device in the direction of the optical axis of the lens module are lower than the height of the first side surface in the direction of the optical axis of the lens module.

According to another aspect of the present disclosure, there is provided a camera module comprising: the optical actuator described previously; and a light deflecting mechanism adapted to reflect light to the lens module of the optical actuator; wherein the optical axis of the lens module is perpendicular to the direction in which the light is incident on the light deflecting mechanism, and the first side surfaces are parallel to the direction in which the light is incident on the light deflecting mechanism.

In some embodiments, in the optical actuator, the outer side surface further includes two second side surfaces, each of the second side surfaces intersects with the first side surfaces, and the two second side surfaces are disposed opposite to each other; and the second side surfaces are perpendicular to the direction in which the light is incident on the light deflecting mechanism.

According to still another aspect of the present disclosure, there is provided a camera module array, comprising at least one camera module described previously.

Compared with the prior art, the present disclosure has at least one of the following technical effects:
1. The present disclosure can significantly reduce the size of the optical actuator in the Y direction (referring to the Y direction in the plane right-angle XOY coordinate system perpendicular to the lens optical axis), thereby facilitating the installation of the moving focus module as a front camera to a smart phone with a high screen-to-body ratio (or other smart devices with high screen-to-body ratios).
2. The present disclosure can facilitate the installation of the moving focus module as a front camera to a smart phone with a high screen-to-body ratio (or other smart devices with high screen-to-body ratios).
3. The present disclosure can arrange a longer shape memory alloy wire on a single side surface, thereby increasing the driving force to drive the lens module to move, and at the same time, any two shape memory alloy wires do not contact each other, thereby preventing the shape memory alloy wires from rubbing against each other to produce wear when the lens is driven to move.
4. The present disclosure can enhance the stability of the lens module by eliminating undesirable moments that can cause the lens module to deflect.
5. The present disclosure can reduce the size of the SMA-based camera module through the periscope structure, thereby allowing the camera module to be arranged so that the Y direction is consistent with the thickness direction of the mobile phone or other smart devices, thereby helping to reduce the thickness of the mobile phone or other smart devices.

BRIEF DESCRIPTION OF THE DRAWINGS

The exemplary embodiments are shown in the reference drawings. The embodiments and drawings disclosed herein are to be considered illustrative and not restrictive.

LISTING OF REFERENCE SIGNS

Figure 1:
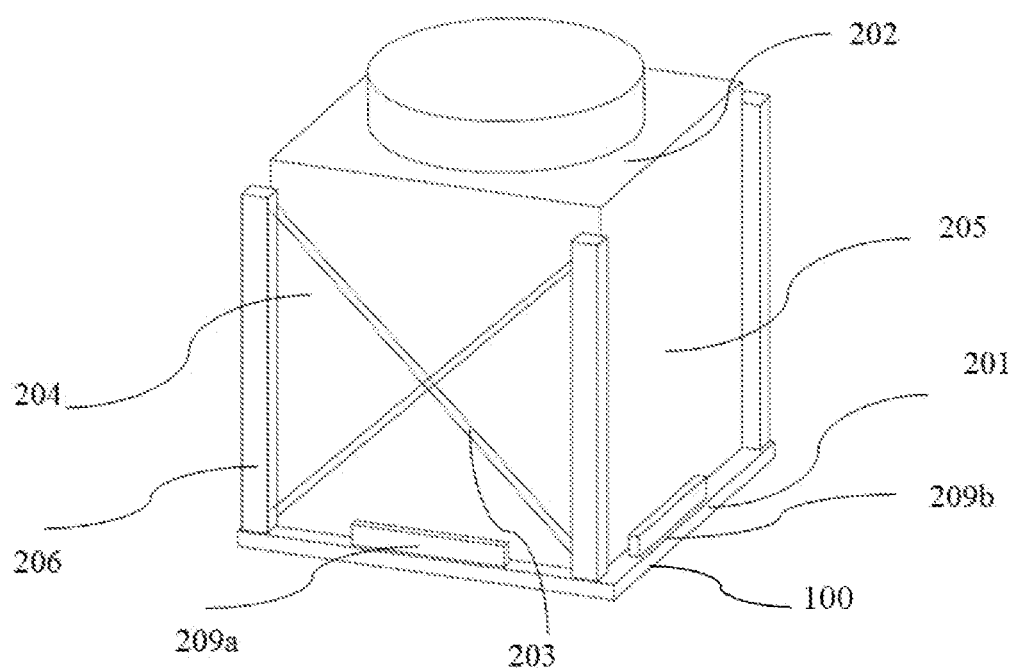
FIG. 1 shows a schematic perspective view of an optical actuator of an embodiment of the present disclosure.

100—base;
201—support base; 202—lens module; 203—shape memory alloy wire;
204—first side surface; 205—second side surface; 206—base-end fixing device;
207—lens-end fixing device; 208—limit column;
209a—first limit structure; 209b—second limit structure; 210—base-end fixing terminal;
211—lens-end fixing terminal; 301—photosensitive assembly;
302—optical actuator with shape memory alloy wires; 303—light deflecting mechanism;
401—periscope camera module; 402—general camera module.

DETAILED DESCRIPTION OF THE EMBODIMENTS

In order to better understand the present application, various aspects of the present application will be described in more detail with reference to the drawings. It should be understood that the detailed description is merely description of exemplary embodiments of the present application, and does not limit the scope of the present application in any way. Throughout the description, the same reference numerals refer to the same elements. The expression "and/or" includes any and all combinations of one or more of the associated listed items.

It should be noted that in the present description, the expressions of "first", "second", etc. are only used to distinguish one feature from another feature, and do not indicate any limitation on the feature. Therefore, without departing from the teachings of the present application, a first main body discussed below may also be referred to as a second main body.

In the drawings, for convenience of explanation, the thickness, size, and shape of the object have been slightly exaggerated. The drawings are only examples and are not drawn to scale.

It should also be understood that the terms "comprising", "comprise", "having", "including" and/or "include" when used in the present description, indicate the existence of stated features, integers, steps, operations, elements and/or components, but does not exclude the presence or addition of one or more other features, integers, steps, operations, elements, components and/or combinations thereof. Furthermore, when an expression such as "at least one of" appears after the list of listed features, it modifies the entire listed feature, rather than the individual elements in the list. In addition, when describing an implementation of the present application, "may" is used to denote "one or more implementations of the present application". Also, the term "exemplary" is intended to refer to an example or illustration.

As used herein, the terms "substantially", "approximately" and similar terms are used as a term expressing an approximation and not as a term expressing an extent, and are intended to indicate an inherent deviation in a measurement value or calculated value, which will be recognized by those of ordinary skill in the art.

Unless otherwise defined, all terms (including technical and scientific terms) used herein have the same meanings as commonly understood by those of ordinary skill in the art to which the present application belongs. It should also be understood that the terms (such as those defined in commonly used dictionaries) should be interpreted to have meanings consistent with their meaning in the context of the relevant art and will not be interpreted in an idealized or overly formal sense unless it is clearly defined herein.

It should be noted that, in the case of no conflict, the embodiments in the present application and the features in the embodiments can be combined with each other. The present application will be described in detail below in conjunction with embodiments with reference to the drawings.

FIG. 1 shows a schematic perspective view of an optical actuator of an embodiment of the present disclosure. The optical actuator includes a base 100, a lens module 202, and a plurality of shape memory alloy wires 203. In the present embodiment, the base 100 is a support base 201. The lens module 202 has an outer side surface including two first side surfaces 204 and two second side surfaces 205. The two first side surfaces 204 are disposed opposite to each other, each of the second side surfaces 205 intersects with the first side surfaces 204, and the two second side surfaces 205 are disposed opposite to each other. In the example of FIG. 1, the two first side surfaces 204 of the lens module 202 are both flat and parallel to each other, and the two second side surfaces 205 are both flat and parallel to each other. The plurality of shape memory alloy wires 203 form two wire groups. The two wire groups are arranged on the two first side surfaces 204, respectively. Two ends of each shape memory alloy wire 203 are fixed to a base-end fixing device 206 and a lens-end fixing device, respectively (due to the angle, the lens-end fixing device in FIG. 1 is blocked by the base-end fixing device 206). The base-end fixing device 206 is fixed to the base, and the lens-end fixing device 207 is disposed on the first side surface 204 and fixed to the lens module 202. In the present embodiment, the direction of the resultant force acting on the lens module by two wire groups respectively arranged on two first side surfaces is consistent with the direction of the optical axis of the lens module, so that the lens module is driven to move along the direction of the optical axis of the lens module by means of expansion and contraction of the shape memory alloy wires of the two wire groups. In this way, autofocus may be achieved only by the two wire groups arranged on the two first side surfaces 204, and the shape memory alloy wires may not be arranged on the two second side surfaces 205, thereby reducing the volume of the optical actuator and the corresponding camera module. In particular, the size of the optical actuator in the Y direction can be reduced. The Y direction refers to the Y direction in a right-angle XOY coordinate system on a plane perpendicular to the optical axis of the lens. Moreover, the Y direction is parallel to the first side surface 204 and an X direction is perpendicular to the first side surface 204.

Further, still referring to FIG. 1, in an embodiment, each wire group includes two sub-wire groups. Each sub-wire group includes two shape memory alloy wires 203. For each sub-wire group, projections of its two shape memory alloy wires 203 on the first side surface 204 are in a crossing state, and the two shape memory alloy wires 203 are staggered in the direction perpendicular to the first side surface 204, so that the two shape memory alloy wires 203 are not coplanar. The above crossing state allows the shape memory alloy wires 203 arranged on the first side surface 204 to have a greater length, thereby increasing the stroke of the lens module 202. Referring to FIG. 1, the two shape memory alloy wires 203 in the sub-wire group cross, so that the two shape memory alloy wires 203 can be arranged along the diagonal lines of the first side surface 204, respectively, so as to increase the length of the shape memory alloy wire 203 as much as possible. On the other hand, the four shape memory alloy wires 203 on each side surface are not in contact with each other, preventing the shape memory alloy wires 203 from rubbing against each other when driving the lens to move.

Further, in an embodiment, two sub-wire groups arranged on the same first side surface 204 are configured in a symmetrical state so that the lens module 202 keeps balanced. Since the two shape memory alloy wires 203 in the sub-wire group cross, but at the same time, the two shape memory alloy wires 203 are staggered in the direction perpendicular to the first side surface 204, so that the two shape memory alloy wires 203 are difficult to be arranged to be parallel to the first side surface 204 at the same time, thereby generating a moment that deflects the lens module 202. In other words, for two sub-wire groups arranged on the same first side surface 204, each of the sub-wire groups may generate a moment that deflects the lens module 202 due to its two shape memory alloy wires 203 staggering in the direction perpendicular to the first side surface 204. However, such a moment may cause the stability of the lens module 202 to decrease. In the present embodiment, it is possible to eliminate the undesirable moment that may cause the lens module 202 to deflect by configuring the two sub-wire groups so that the moments that cause the lens module 202 to deflect respectively produced by them cancel each other or partially cancel each other, thereby enhancing the stability of the lens module 202.

Still referring to FIG. 1, in an embodiment, each first side surface 204 has two edges perpendicular to the surface of the base. The lens-end fixing devices are four lens-end fixing terminals disposed on the first side surface 204, and the lens-end fixing terminal may be a fixing structure disposed on the surface of the first side surface 204. The base-end fixing device 206 is two vertical columns fixed to the base, the two vertical columns are arranged along the two edges, respectively, and there is a gap between the vertical column and the first side surface 204. In the direction perpendicular to the first side surface, there is a gap between the vertical column and the lens-end fixing device. This gap can leave an avoidance space for the shape memory alloy wires to prevent interference. Each vertical column has two base-end fixing terminals. Each shape memory alloy wire 203 has two mounting ends, and the two mounting ends are mounted on the base-end fixing terminal and the lens-end fixing terminal, respectively.

Further, in an embodiment, referring to FIG. 1, the upper surface of the support base 201 has a limit structure to prevent the lens module 202 from deviating from the optical axis. The limit structure includes two second limit structures 209b respectively disposed outside two second side surfaces 205. In another embodiment, the limit structure may further include two first limit structures 209a disposed outside the two first side surfaces 204, respectively.

Further referring to FIG. 1, in an embodiment, the four side surfaces of the lens module 202 are each provided with a limit structure on the support base 201 (the limit structure may include a first limit structure 209a and a second limit structure 209b), and there is a certain gap between any limit structure and the lens module 202 for the lens to move under the drive of the shape memory alloy wires 203. The presence of the limit structure can also limit the movement range of the lens module 202 to prevent the lens module 202 from being subjected to strong impact under the action of a large external force, thereby exceeding the actual desired stroke range. This causes damage to the shape memory alloy wires 203, and even to affects the function of the entire camera module with shape memory alloy wires. The base-end fixing device 206 is disposed on the support base 201, and the base-end fixing device 206 has a higher structural strength. This is mainly because in the direction of the mounting side surface, the base-end fixing device 206 will be subjected to a tension from the shape memory alloy wires 203. By thickening the size, base-end fixing device 206 is prevented from deforming or even breaking under the action of the tension from the shape memory alloy wires 203, which affects the overall reliability of the camera module with shape memory alloy wires.

Figure 2:
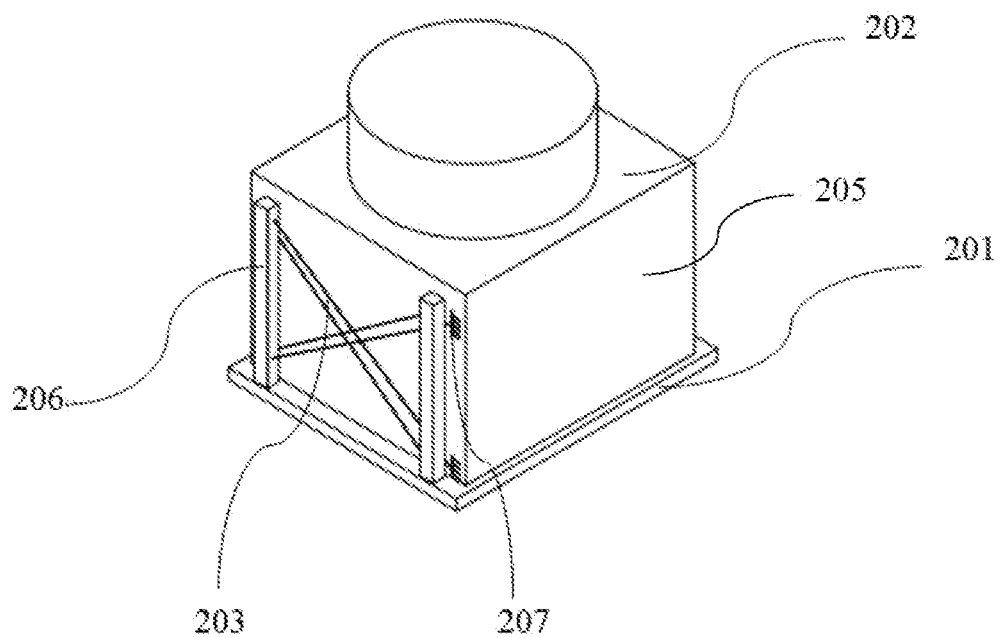
FIG. 2 shows a schematic perspective view of an optical actuator of another embodiment of the present disclosure.

FIG. 2 shows a schematic perspective view of an optical actuator of another embodiment of the present disclosure. As shown in FIG. 2, the base-end fixing devices 206 are all provided on the first side surface 204 on which the shape memory alloy wires 203 are mounted, and the distance between two base-end fixing devices 206 on the same side surface is smaller than the size of the lens module 202 corresponding to this side surface, so that the base-end fixing devices 206 does not occupy the space on the two side surfaces on which the shape memory alloy wires 203 are not mounted, which can effectively reduce the spacing between the two side surfaces on which the shape memory alloy wires 203 are not mounted, and reduce the size of the module in this direction. On the other hand, the optical actuator in FIG. 2 also eliminates the limit structure outside two side surfaces (i.e., the second side surfaces 205) on which the shape memory alloy wires 203 are not mounted, thereby further reducing the size of the Y direction of the optical actuator.

Figure 3:
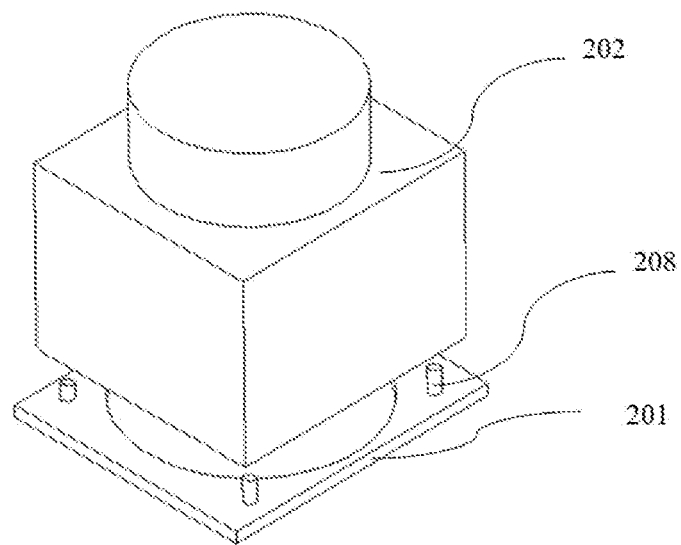
FIG. 3 shows a schematic perspective view of an optical actuator of further another embodiment of the present disclosure.

FIG. 3 shows a schematic perspective view of an optical actuator of further another embodiment of the present disclosure. The main improvement of the embodiment is the limit structure. In order to make the illustration clear, the lens-end fixing device 207 and the base-end fixing device 206 are hidden in FIG. 3. Referring to FIG. 3, the limit structure on the surface of the base are limit columns 208 adapted to the limit holes (the limit holes are not shown in FIG. 3 due to the viewing angle), and the bottom surface of the lens module 202 has limit holes (not shown in FIG. 3). The limit columns 208 are disposed at positions on the upper surface of the support base 201 corresponding to the limit holes on the bottom surface of the lens module 202.

Referring to FIG. 3, the parts of four corners of the support base 201 are provided with limit columns 208. The corresponding positions on the side of the lens module 202 in contact with the support base 201 are provided with limit holes. The limit holes and the limit columns 208 cooperate with each other to realize the limit effect on the lens module 202, which can replace the limit structures 209a and 209b in FIG. 1, further reducing the volume of the optical actuator with shape memory alloy wires and thereby reducing the volume of the corresponding camera module. The positional relationship between the limit columns 208 and the limit holes can also be exchanged to a certain extent, that is, the limit columns can be provided at the bottom of the lens module 202, the limit holes can be provided at the corresponding position of the support base 201, the limit columns and the limit holes correspondingly cooperate with each other to realize the limit effect on the lens module 202. Further, the matching gap between the limit columns and the limit holes is not less than a preset stroke of the camera module with shape memory alloy wires, thereby not affecting the normal movement of the camera module with shape memory alloy wires. Furthermore, a housing needs to be added to outside the base-end fixing device 206, the shape memory alloy wires 203 and the lens fixing end for protection, to prevent damage to the shape memory alloy wires 203 during the module assembly process. The housing is preferably provided on two side surfaces on which the shape memory alloy wires 203 are mounted, so that it does not occupy the installation space on two side surfaces on which the shape memory alloy wires 203 are not mounted, which can thus ensure the size advantage of two side surfaces (i.e., the second side surfaces) on which the shape memory alloy wires 203 are not mounted.

Figure 4:
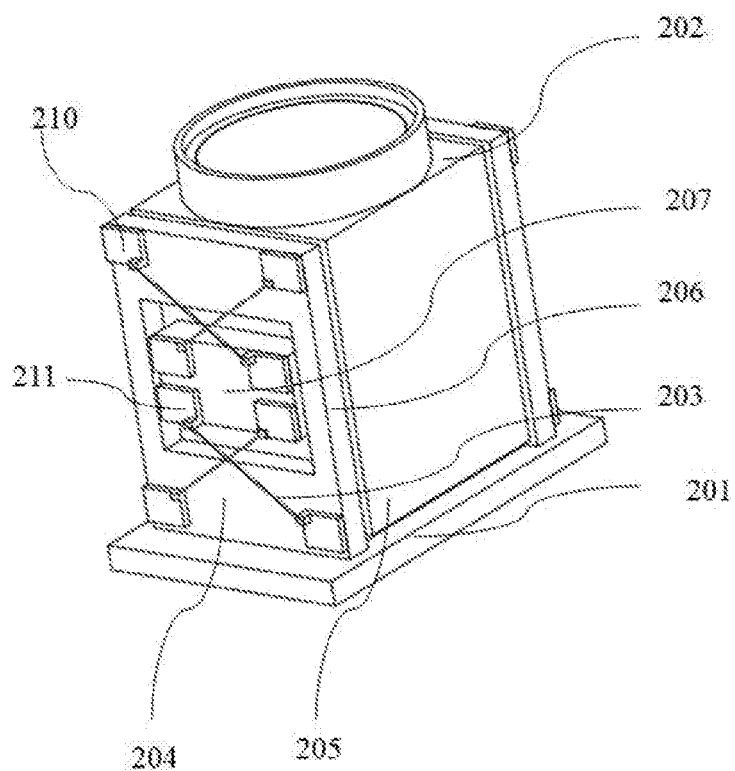
FIG. 4 shows a schematic perspective view of an optical actuator of still another embodiment of the present disclosure.

FIG. 4 shows a schematic perspective view of an optical actuator of still another embodiment of the present disclosure. Referring to FIG. 4, in the present embodiment, the lens-end fixing device 207 includes a protrusion provided in the central area of the first side surface 204 and protruding outward. The base-end fixing device 206 includes a fixing plate disposed outside the first side surface 204, and the surface of the fixing plate is disposed opposite to the first side surface 204, and has a through hole adapted to the protrusion. The surface of the fixing plate facing away from the first side surface 204 has a base-end fixing terminal 210, a lens-end fixing terminal 211 is provided on the protrusion, each shape memory alloy wire 203 has two mounting ends, and the two mounting ends are mounted on the base-end fixing terminal 210 and the lens-end fixing terminal 211, respectively. Each fixing plate has four base-end fixing terminals 210, and the four base-end fixing terminals 210 are each disposed at positions away from the protrusion on the surface of the fixing plate facing away from the first side surface 204. In the present embodiment, each protrusion has four lens-end fixing terminals 211.

Referring to FIG. 4, the shape memory alloy wires 203 are still disposed on two first side surfaces 204 of the lens module 202 disposed opposite to each other, and the four shape memory alloy wires 203 on each side surface are divided into two groups with two wires as a group. Each group of shape memory alloy wires 203 are disposed crosswise, and two ends of the shape memory alloy wires 203 are fixed to the base-end fixing device 206 and the lens-end fixing device 207, respectively. In the present embodiment, the base-end fixing device 206 is disposed on two first side surfaces 204 opposite to each other. A through hole is provided in the central position of the base-end fixing device 206, and the lens-end fixing device 207 extends outward from the through hole and has a height difference with the base-end fixing device 206, thereby ensuring that the two shape memory alloy wires 203 crossing each other will not interfere with each other. The lens-end fixing device 207 is a ground wire connecting end. The shape memory alloy wires 203 are mounted at one end of the lens-end fixing device 207 for connecting to a ground wire, and is mounted at one end of the base-end fixing device 206 for connecting to a power wire. Four shape memory alloy wires 203 can share a ground wire connecting end, but each shape memory alloy wire 203 connected to one end of the power wire is controlled separately, so that different currents are applied to different shape memory alloy wires 203 under different conditions. Different temperatures are obtained to control the shape memory alloy wires 203 to achieve different amounts of expansion and contraction and different amounts of stretching, thereby controlling the lens to be in different position states. Further, in order to ensure the stability of the lens module 202 during the movement, the shape memory alloy wires 203 are controlled as much as possible to control the middle position of the lens module 202.

Further, FIGS. 5A to E shows schematic views of a plan layout of a wire group of an optical actuator arranged on the first side surface 204 in a series of modified embodiments of the present disclosure. In FIGS. 5A to E, the dot-and-dash lines each indicate the optical axis direction.

Figure 5A:
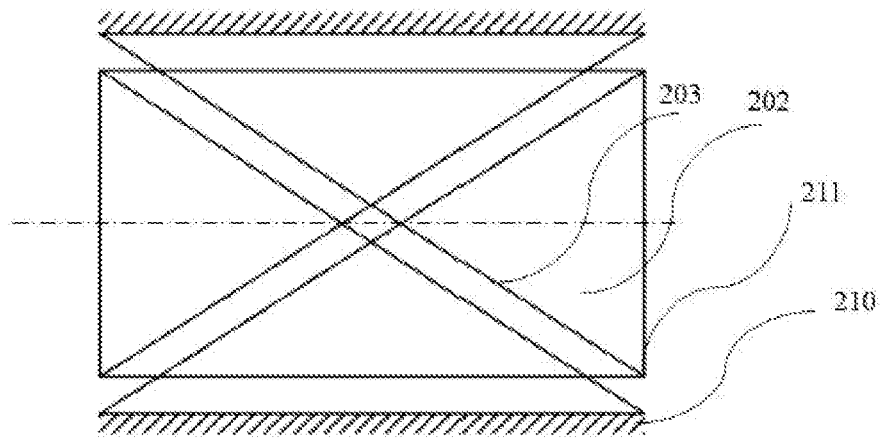
FIGS. 5A to E shows schematic views of a plan layout of a wire group of an optical actuator arranged on the first side surface 204 in a series of modified embodiments of the present disclosure.

Referring to FIG. 5A, in an embodiment, each base-end fixing device has four base-end fixing terminals 210, and each lens-end fixing device 207 has four lens-end fixing terminals 211; wherein each shape memory alloy wire 203 has two mounting ends, and the two mounting ends are mounted on the base-end fixing terminal 210 and the lens-end fixing terminal 211, respectively. Each first side surface has four corners. The four lens-end fixing terminals 211 are arranged at positions corresponding to the four corners of the first side surface 204 on the lens-end fixing device 207, respectively. The four base-end fixing terminals 210 are arranged at positions corresponding to the four corners of the first side surface on the base-end fixing device 206, respectively.

Referring to FIG. 5A, the installation positions of the four shape memory alloy wires 203 shown in the figure on the base-end fixing device and the lens module 202 are symmetrical to each other. However, in actual installation, since the mutual interference between the shape memory alloy wires 203 are to be avoided, there is a slight deviation between the actual installation positions of the shape memory alloy wires 203. There may be a case where the shape memory alloy wires 203 are not completely symmetrical, but it does not affect the shape memory alloy wires 203 to drive the lens to move.

Figure 5B:
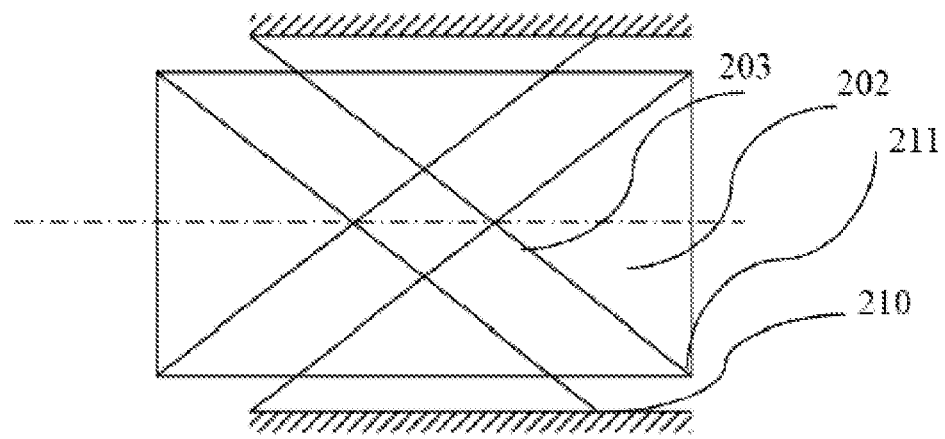
Figure 5C:
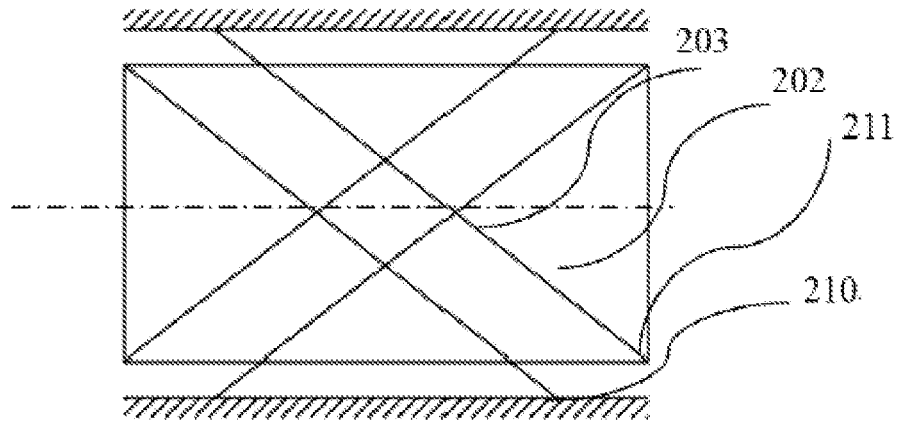

Referring to FIGS. 5B and 5C, in the two embodiments, each first side surface has four corners and has two edges parallel to the optical axis of the lens module 202. The four lens-end fixing terminals 211 are arranged at positions corresponding to the four corners of the first side surface 204 on the lens-end fixing device, respectively. Two of the four base-end fixing terminals 210 are arranged along one of the two edges, the other two of the four base-end fixing terminals 210 are to arranged along the other one of the two edges, and the distance between the two base-end fixing terminals 210 arranged along the same edge is smaller than the distance between the corresponding two lens-end fixing terminals 211. Compared with the embodiment of FIG. 5A, the layout shown in FIGS. 5B and 5C can increase the spacing between the four shape memory alloy wires 203 after the installation is completed, thereby facilitating the shape memory alloy wires 203 to drive the lens to move, and reducing the risk of mutual interference between different shape memory alloy wires 203.

Figure 5D:
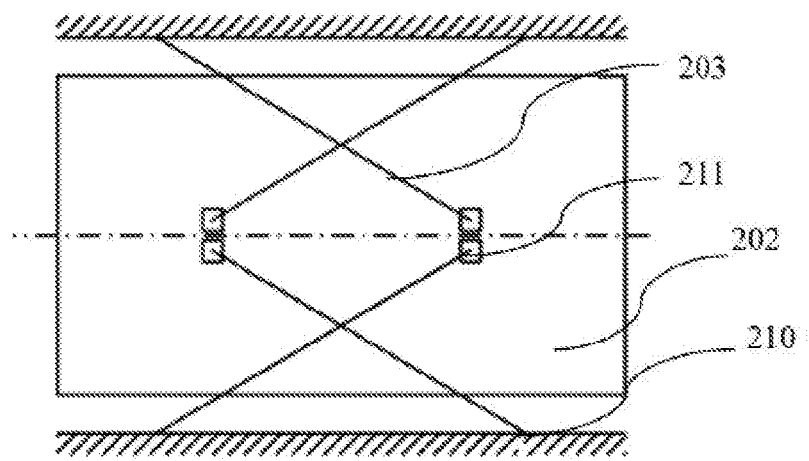

Referring to FIG. 5D, in an embodiment, each first side surface has two edges parallel to the optical axis of the lens module 202. The four lens-end fixing terminals 211 are arranged in the central area of the first side surface. Two of the four base-end fixing terminals 210 are arranged along one of the two edges, and the other two of the four base-end fixing terminals 210 are arranged along the other one of the two edges. The projections of any two shape memory alloy wires 203 belonging to different sub-wire groups on the first side surface do not cross. In this way, the risk of mutual interference between different shape memory alloy wires can be further reduced.

Figure 5E:
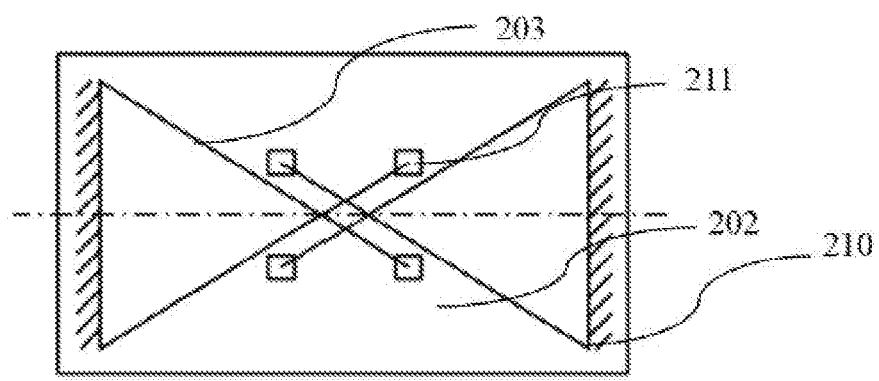

Referring to FIG. 5E, in an embodiment, each first side surface has two edges perpendicular to the optical axis of the lens module 202. The four lens-end fixing terminals 211 are arranged in the central area of the first side surface. Two of the four base-end fixing terminals 210 are arranged along one of the two edges, and the other two of the four base-end fixing terminals 210 are arranged along the other one of the two edges. There are two shape memory alloy wires 203 belonging to different sub-wire groups, and the projections of the two shape memory alloy wires 203 on the first side surface are in a crossing state. Compared with the embodiment of FIG. 5A, the layout shown in FIG. 5E can increase the spacing between the four shape memory alloy wires after the installation is completed, thereby facilitating the shape memory alloy wires to drive the lens to move, and reducing the risk of mutual interference between different shape memory alloy wires. Compared with the embodiment of FIG. 5D, the layout shown in FIG. 5E helps to increase the length of the shape memory alloy wires, thereby helping to increase the stroke of the lens module.

Further, in some embodiments, the heights of the base-end fixing device 206 and the lens-end fixing device 207 in the optical axis direction of the lens module 202 are lower than the height of the first side surface 204 in the optical axis direction of the lens module 202.

Figure 8:
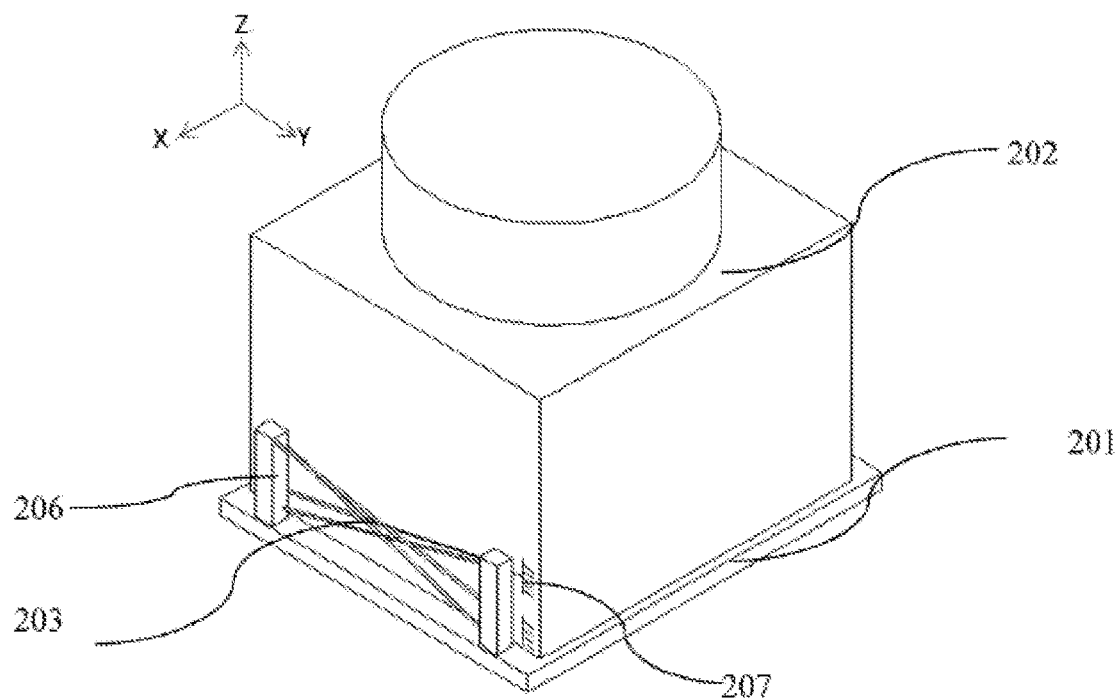
FIG. 8 shows another embodiment of an optical actuator with shape memory alloy wires of the present disclosure.

FIG. 8 shows another embodiment of the optical actuator with shape memory alloy wires of the present disclosure, wherein the shape memory alloy wires 203 are mounted at a position closer to the lower end of the lens module 202, that is, the height of the base-end fixing device 206 is lower than the height of the lens module 202, and the position where the shape memory alloy wires 203 are mounted on the lens module 202 is also lower than the lens height. The shape memory alloy wires 203 control the overall movement of the lens module 202 by controlling the position of the lower half of the lens module 202, so that the shape memory alloy wires 203 drive the lens to move.

By setting the shape memory alloy wires at the bottom of the lens module to drive the lens module to move, the shoulder height of the camera module with shape memory alloy wires can be reduced, thereby reducing the volume occupied by the camera module with shape memory alloy wires.

The space and volume occupied by the shape memory alloy wires on the side surface of the lens module can be controlled by adjusting the installation location of the shape memory alloy wires, and the space and volume occupied by the shape memory alloy wires can be reduced by reducing the spacing between the two crossed shape memory alloy wires. However, at the same time, it brings a problem that it will cause the stroke of the lens driven by the shape memory alloy wires to become smaller, so that the solution in the present embodiment is not applicable to the rear camera of the mobile phone. However, since the stroke requirement of the front camera of the mobile phone is much smaller than that of the rear camera of the mobile phone, the solution in the present embodiment is applicable to the front camera of a mobile phone, and can meet the development of thin and light mobile phones.

Further, since the shape memory alloy wires 203 are only mounted on one group of side surfaces of the lens module 202 disposed opposite to each other, the size of the camera module with shape memory alloy wires can be reduced in the direction on the other side. If this direction corresponds to the longitudinal dimension of the mobile phone, then the space occupied by the camera module with shape memory alloy wires in the longitudinal dimension of the mobile phone can be effectively reduced.

Figure 9:
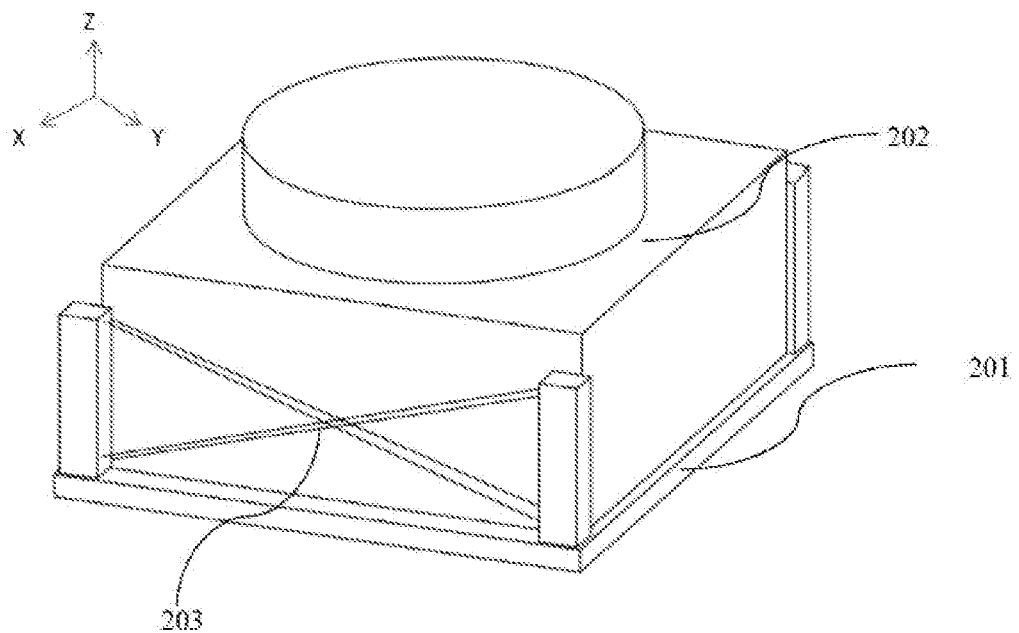
FIG. 9 shows a modified embodiment based on the embodiment shown in FIG. 8.

FIG. 9 shows a modified embodiment based on the embodiment shown in FIG. 8, that is, the overall height of the lens module 202 is reduced, thereby reducing the overall height of the module on the basis of reducing the shoulder height, reducing the space occupied by the camera module with shape memory alloy wires inside the mobile phone, and making the camera module with shape memory alloy wires have wider applicability.

Figure 10:
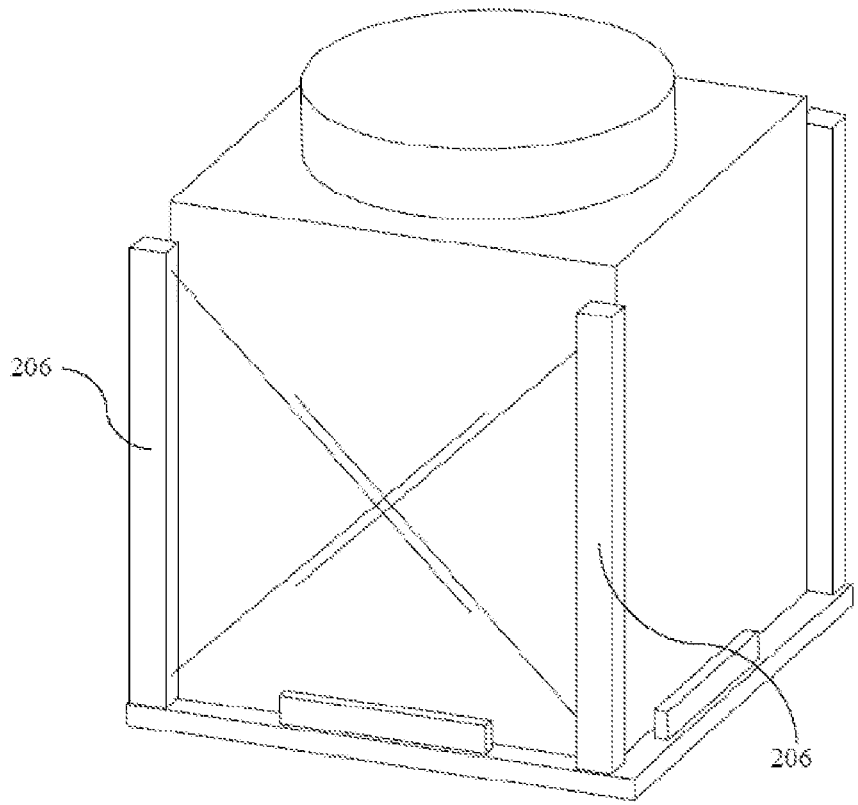
FIG. 10 shows an optical actuator of another modified embodiment of the present disclosure.

FIG. 10 shows an optical actuator of another modified embodiment of the present disclosure. In the present embodiment, the base-end fixing device 206 includes two vertical columns, which are arranged along two edges of the first side surface perpendicular to the support base, respectively. Each vertical column is arranged with two base-end fixing terminals. The lens-end fixing terminals are disposed on the first side surface. Moreover, the positions of the lens-end fixing terminals and the base-end fixing terminals are staggered, so that the distance between the lens-end fixing terminals is smaller than the distance between the base-end fixing terminals. In this way, the position of the base-end fixing terminal can be avoided from hindering the installation of the shape memory alloy wires.

Figure 6:
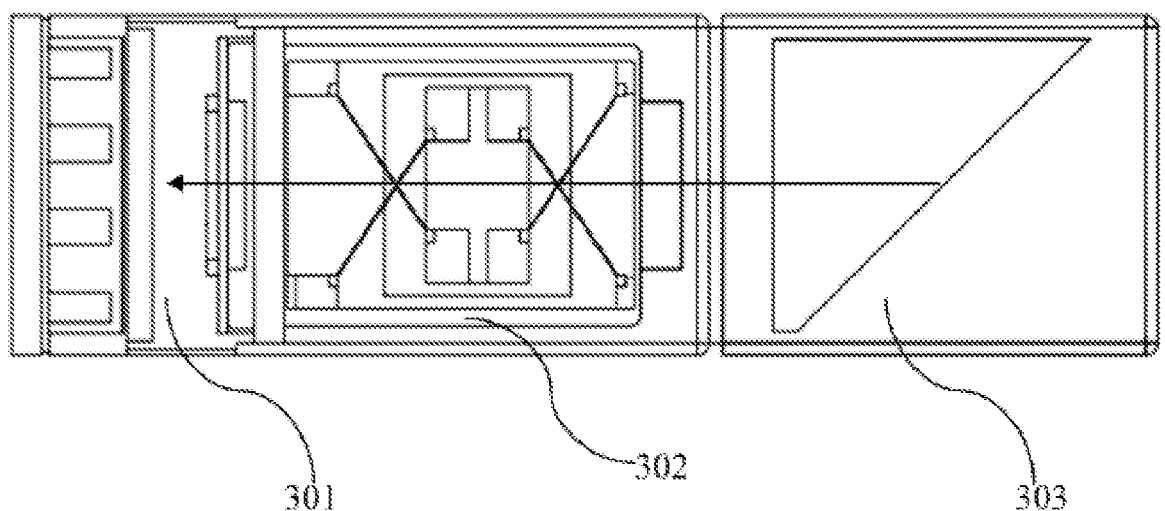
FIG. 6 shows a side view of a camera module provided by an embodiment of the present disclosure.

Further, FIG. 6 shows a side view of a camera module provided by an embodiment of the present disclosure. The camera module includes a photosensitive assembly 301, the optical actuator 302 (including a lens module) based on the shape memory alloy wires of the foregoing embodiment, and a light deflecting mechanism 303. The camera module of the present embodiment adopts a periscope structure. The optical actuator 302 based on the shape memory alloy wires and the photosensitive assembly 301 can form a camera unit based on the shape memory alloy wires, and the camera unit is placed on its side so that the optical axis direction of the lens to module of the camera unit is perpendicular to the light incidence direction of the complete camera module. It should be noted that the light incident direction of the complete camera module is the direction in which external light is incident onto the light deflecting mechanism 303.

The optical path is changed by the light deflecting mechanism 303 and the incident light is reflected into the imaging unit based on the shape memory alloy wires, so that the imaging function can be realized.

In the present embodiment, the installation state of the shape memory alloy wires can be seen from the side view. That is, the first sides of the optical actuator for arranging the shape memory alloy wires are parallel to the light incident direction of the complete camera module. However, the second side surfaces on which the shape memory alloy wires are not arranged are perpendicular to the light incident direction of the complete camera module. In this way, the space for installing the shape memory alloy wires can be saved in the light incident direction, so that the size of the camera module in the light incident direction can be reduced. When such a periscope camera module is mounted in a smart phone (or other smart devices), the space occupied by the camera module inside the mobile phone in the direction perpendicular to the screen of the mobile phone can be reduced. That is, compared to the traditional module, the camera module in the present embodiment can better adapt to the development trend of thin and light mobile phones and bring a better photographing experience to the users while ensuring the quality of photos.

Further, since the camera module of the present embodiment is placed on its side, the optical axis direction of the camera module (referring to the optical axis direction of the lens module) no longer corresponds to the thickness direction of the mobile phone. Therefore, it can reduce the limitation of the thin and light design of the mobile phone on the size of the camera module in the optical axis direction, and the lens module can obtain a larger range of movement in the optical axis direction of the lens.

Figure 7:
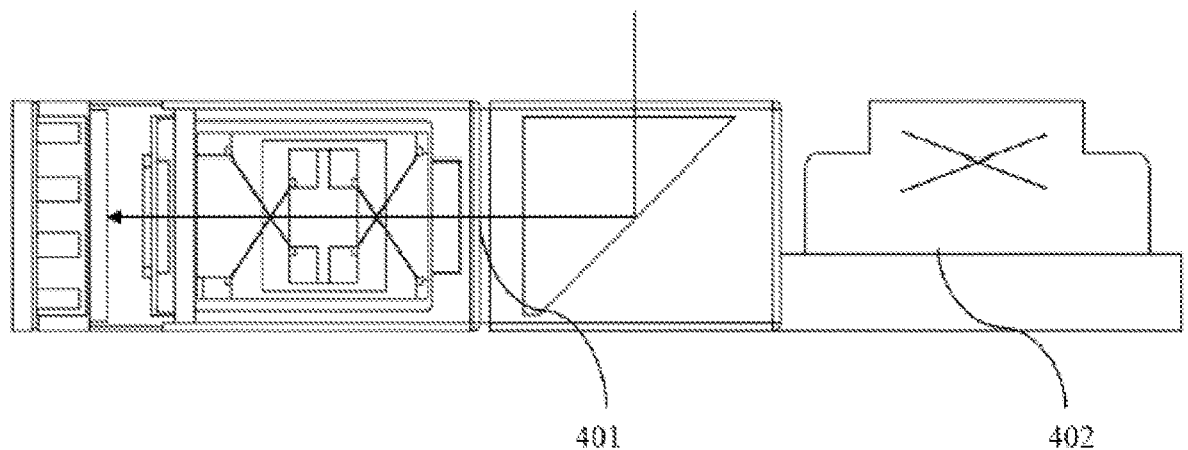
FIG. 7 shows a dual camera module based on a periscope structure in an embodiment of the present disclosure.

Still further, FIG. 7 shows a dual camera module based on a periscope structure in an embodiment of the present disclosure. In the present embodiment, a periscope camera module 401 and a general camera module 402 are used to form a dual camera module. The general camera module 402 refers to a camera module in which the optical axis direction of the lens coincides with the light incident direction of the module. The general camera module 402 may be a general AF or FF module that is currently conventionally used in the industry. The periscope camera module 401 includes a light deflecting mechanism and a camera unit based on shape memory alloy wires. By post-synthesizing the images formed by the above two modules, high-quality photos can be obtained to better meet customer needs.

In the present embodiment, the optical axes of the general module and the periscope module are perpendicular to each other, and the optical axis direction of the general module corresponds to the direction of the incident light, so that the size of the periscope module in the optical axis direction will not be excessively limited.

The above description is only the preferred implementations of the present application and the explanation of the applied technical principles. It should be understood by those skilled in the art that the scope of disclosure involved in the present application is not limited to technical solutions formed by specific combinations of the above technical features, and at the same time, should also cover other technical solutions formed by any combination of the above technical features or equivalent features thereof without departing from the concept of the disclosure. For example, the above features and (but not limited to) the technical features with similar functions disclosed in the present application are replaced with each other to form technical solutions.

The invention claimed is:

1. An optical actuator, comprising:
a base;
a lens module having an outer side surface including two first side surfaces opposite to each other; and
a plurality of shape memory alloy wires forming two wire groups, wherein the two wire groups are disposed on the two first side surfaces, respectively; and two ends of each shape memory alloy wire are fixed on a base-end fixing device and a lens-end fixing device, respectively, wherein the base-end fixing device is fixed to the base, and the lens-end fixing device is disposed on the first side surface and fixed to the lens module;
wherein the direction of a resultant force acting on the lens module by the two wire groups is consistent with the direction of an optical axis of the lens module, so that the lens module is driven to move along the direction of the optical axis of the lens module by means of expansion and contraction of the shape memory alloy wires of the two wire groups;
wherein each of the two wire groups includes two sub-wire groups, each sub-wire group including two shape memory alloy wires;
wherein for each sub-wire group, projections of its two shape memory alloy wires on the first side surface are in a crossing state, and the two shape memory alloy wires are staggered in the direction perpendicular to the first side surface, so that the two shape memory alloy wires are not coplanar.

2. The optical actuator according to claim 1, wherein two sub-wire groups arranged on the same first side surface are configured in a symmetrical state so that the lens module keeps balanced.

3. The optical actuator according to claim 1, wherein the base is a support base, and an upper surface of the support base has a limit structure to prevent the lens module from deviating from the optical axis.

4. The optical actuator according to claim 3, wherein the outer side surface further includes two second side surfaces, wherein each of the second side surfaces intersects the first side surfaces and the two second side surfaces are disposed opposite to each other, and the limit structure includes two second limit structures respectively disposed outside the two second side surfaces.

5. The optical actuator according to claim 4, wherein the limit structure further includes two first limit structures respectively disposed outside the two first side surfaces.

6. The optical actuator according to claim 1, wherein each of the first side surfaces has two edges perpendicular to the surface of the base;
the lens-end fixing device is a lens-end fixing terminal disposed on the first side surface; and
the base-end fixing device is two vertical columns fixed to the base, the two vertical columns are arranged along the two edges, respectively, and there is a gap between the vertical column and the first side surface.

7. The optical actuator according to claim 6, wherein each of the vertical columns has two base-end fixing terminals, and the first side surface is provided with four lens-end fixing terminals; wherein each of the shape memory alloy wires has two mounting ends, and the two mounting ends are mounted on the base-end fixing terminal and the lens-end fixing terminal, respectively.

8. The optical actuator according to claim 1, wherein each of the base-end fixing devices has four base-end fixing terminals, and each of the lens-end fixing devices has four lens-end fixing terminals; wherein each of the shape memory alloy wires has two mounting ends, and the two mounting ends are mounted on the base-end fixing terminal and the lens-end fixing terminal, respectively.

9. The optical actuator according to claim 8, wherein each of the first side surfaces has four corners;
the four lens-end fixing terminals are arranged at positions on the lens-end fixing device corresponding to the four corners of the first side surface, respectively; and
the four base-end fixing terminals are arranged at positions on the base-end fixing device corresponding to the four corners of the first side surface, respectively.

10. The optical actuator according to claim 8, wherein each of the first side surfaces has four corners and has two edges parallel to the optical axis of the lens module;
the four lens-end fixing terminals are arranged at positions on the lens-end fixing device corresponding to the four corners of the first side surface, respectively; and
two of the four base-end fixing terminals are arranged along one of the two edges, the other two of the four base-end fixing terminals are arranged along the other one of the two edges, and the distance between the two base-end fixing terminals arranged along the same edge is smaller than the distance between the corresponding two lens-end fixing terminals.

11. The optical actuator according to claim 8, wherein each of the first side surfaces has two edges parallel to the optical axis of the lens module;
the four lens-end fixing terminals are arranged in the central area of the first side surface; and
two of the four base-end fixing terminals are arranged along one of the two edges, and the other two of the four base-end fixing terminals are arranged along the other one of the two edges.

12. The optical actuator according to claim 11, wherein the projections of any two shape memory alloy wires belonging to different sub-wire groups on the first side surface do not cross.

13. The optical actuator according to claim 8, wherein each of the first side surfaces has two edges perpendicular to the optical axis of the lens module;
the four lens-end fixing terminals are arranged in the central area of the first side surface; and
two of the four base-end fixing terminals are arranged along one of the two edges, and the other two of the four base-end fixing terminals are arranged along the other one of the two edges.

14. The optical actuator according to claim 13, wherein there are two shape memory alloy wires belonging to different sub-wire groups, and the projections of the two shape memory alloy wires on the first side surface are in a crossing state.

15. The optical actuator according to claim 1, wherein the heights of the base-end fixing device and the lens-end fixing device in the direction of the optical axis of the lens module are lower than the height of the first side surface in the direction of the optical axis of the lens module.

16. An optical actuator, comprising:
a base;
a lens module having an outer side surface including two first side surfaces opposite to each other; and
a plurality of shape memory alloy wires forming two wire groups, wherein the two wire groups are disposed on the two first side surfaces, respectively; and two ends of each shape memory alloy wire are fixed on a base-end fixing device and a lens-end fixing device, respectively, wherein the base-end fixing device is fixed to the base, and the lens-end fixing device is disposed on the first side surface and fixed to the lens module;
wherein the direction of a resultant force acting on the lens module by the two wire groups is consistent with the direction of an optical axis of the lens module, so that the lens module is driven to move along the direction of the optical axis of the lens module by means of expansion and contraction of the shape memory alloy wires of the two wire groups;
wherein the lens-end fixing device includes a protrusion provided in the central area of the first side surface and protruding outward; and
the base-end fixing device includes a fixing plate disposed outside the first side surface, and the surface of the fixing plate is disposed opposite to the first side surface, and has a through hole adapted to the protrusion.

17. The optical actuator according to claim 16, wherein the surface of the fixing plate facing away from the first side surface has a base-end fixing terminal, a lens-end fixing terminal is provided on the protrusion, each of the shape memory alloy wires has two mounting ends, and the two mounting ends are mounted on the base-end fixing terminal and the lens-end fixing terminal, respectively.

18. A camera module, comprising:
an optical actuator, including:
a base;
a lens module having an outer side surface including two first side surfaces opposite to each other; and
a plurality of shape memory alloy wires forming two wire groups, wherein the two wire groups are disposed on the two first side surfaces, respectively; and two ends of each shape memory alloy wire are fixed on a base-end fixing device and a lens-end fixing device, respectively, wherein the base-end fixing device is fixed to the base, and the lens-end fixing device is disposed on the first side surface and fixed to the lens module;
wherein the direction of a resultant force acting on the lens module by the two wire groups is consistent with the direction of an optical axis of the lens module, so that the lens module is driven to move along the direction of the optical axis of the lens module by means of expansion and contraction of the shape memory alloy wires of the two wire groups; and
a light deflecting mechanism adapted to reflect light to the lens module of the optical actuator;
wherein the optical axis of the lens module is perpendicular to the direction in which the light is incident on the light deflecting mechanism, and the first side surfaces are parallel to the direction in which the light is incident on the light deflecting mechanism.

19. The camera module according to claim 18, wherein in the optical actuator, the outer side surface further includes two second side surfaces, each of the second side surfaces intersects with the first side surfaces, and the two second side surfaces are disposed opposite to each other; and
the second side surfaces are perpendicular to the direction in which the light is incident on the light deflecting mechanism.

* * * * *